(12) United States Patent
Ohara et al.

(10) Patent No.: US 11,380,910 B2
(45) Date of Patent: *Jul. 5, 2022

(54) FUEL CELL AND CELL STACK DEVICE

(71) Applicant: NGK INSULATORS, LTD., Nagoya (JP)

(72) Inventors: Ryuhei Ohara, Nagoya (JP); Hirofumi Kan, Nagoya (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 207 days.

This patent is subject to a terminal disclaimer.

(21) Appl. No.: 16/594,337

(22) Filed: Oct. 7, 2019

(65) Prior Publication Data

US 2020/0144634 A1 May 7, 2020

Related U.S. Application Data

(63) Continuation of application No. PCT/JP2019/020713, filed on May 24, 2019.

(30) Foreign Application Priority Data

Nov. 6, 2018 (JP) .............................. JP2018-209050

(51) Int. Cl.
*H01M 8/0258* (2016.01)
*H01M 8/2484* (2016.01)

(52) U.S. Cl.
CPC ....... *H01M 8/0258* (2013.01); *H01M 8/2484* (2016.02)

(58) Field of Classification Search
CPC .... H01M 8/0258; H01M 8/2484; Y02E 60/50
See application file for complete search history.

(56) References Cited

U.S. PATENT DOCUMENTS

| 5,786,105 A | 7/1998 | Matsushima et al. |
| 2017/0141426 A1 | 5/2017 | Ohmori |
| 2017/0155165 A1* | 6/2017 | Ohmori ................. H01M 8/247 |

FOREIGN PATENT DOCUMENTS

| JP | 62-271354 A | 11/1987 |
| JP | 9-102323 A | 4/1997 |

(Continued)

OTHER PUBLICATIONS

English Translation of the International Preliminary Report on Patentability, issued in corresponding International Application No. PCT/JP2019/020713 dated May 20, 2021 (10 pages).

(Continued)

*Primary Examiner* — Muhammad S Siddiquee
(74) *Attorney, Agent, or Firm* — Flynn Thiel, P.C.

(57) ABSTRACT

A fuel cell includes a support substrate, at least one power generation element portion, at least one first gas channel, and at least one second gas channel. The power generation element portion is disposed on the support substrate. The first and second gas channels extend from a proximal end portion toward a distal end portion in the support substrate and are connected to each other at the distal end portion. The sum of a cross-sectional area of the at least one first gas channel is smaller than the sum of a cross-sectional area of the at least one second gas channel.

7 Claims, 12 Drawing Sheets

(56) References Cited

FOREIGN PATENT DOCUMENTS

| JP | 2002-208417 A | 7/2002 |
|----|---------------|--------|
| JP | 2007-211268 A | 8/2007 |
| JP | 2014-194065 A | 10/2014 |
| JP | 2015025151 A | 2/2015 |
| JP | 2016-171064 A | 9/2016 |
| JP | 2017-17023 A | 1/2017 |
| JP | 2019106361 A | 6/2019 |

OTHER PUBLICATIONS

Japanese language International Search Report, Written Opinion, and Transmittal for the International Search Report and Written Opinion for PCT/JP2019/020713, dated Jul. 16, 2019 (12 pages).
English language International Search Report for corresponding application No. PCT/JP2019/020713, dated Jul. 16, 2019 (2 pages).

* cited by examiner

FUEL CELL AND CELL STACK DEVICE

CROSS-REFERENCE TO RELATED APPLICATIONS

This is a continuation of PCT/JP2019/020713, filed May 24, 2019, which claims priority to Japanese Application No. 2018-209050, filed Nov. 6, 2018, the entire contents of which are hereby incorporated by reference.

TECHNICAL FIELD

The present invention relates to a fuel cell and a cell stack device.

BACKGROUND ART

A cell stack device includes a fuel cell and a manifold. The fuel cell extends upward from the manifold and generates electric power while being supplied with fuel gas from the manifold.

CITATION LIST

Patent Literature

Patent Literature 1: JP 2016-171064A

SUMMARY

Technical Problem

There is a demand for an improvement in the output of a fuel cell in a cell stack device such as that described above. In view of this, the present invention aims to improve the output of a fuel cell.

Solution to Problem

A fuel cell according to a first aspect of the present invention includes a distal end portion and a proximal end portion. The fuel cell includes a support substrate, at least one power generation element portion, at least one first gas channel, and at least one second gas channel. The power generation element portion is disposed on the support substrate. The first and second gas channels extend from the proximal end portion toward the distal end portion in the support substrate and are connected to each other in the distal end portion. The sum of a cross-sectional area of the at least one first gas channel is smaller than the sum of a cross-sectional area of the at least one second gas channel.

As a result of the sum of the cross-sectional area of the at least one first gas channel being made smaller than the sum of the cross-sectional area of the at least one second gas channel, the output of the fuel cell can be improved.

Preferably, a ratio (S1/S2) of the sum (S1) of the cross-sectional area of the at least one first gas channel to the sum (S2) of the cross-sectional area of the at least one second gas channel is 0.92 or less.

Preferably, the at least one first gas channel has a smaller cross-sectional area than that of the at least one second gas channel.

Preferably, the number of first gas channels is smaller than the number of second gas channels.

Preferably, the fuel cell further includes a connection channel. The connection channel connects the at least one first gas channel and the at least one second gas channel to each other in the distal end portion of the fuel cell.

Preferably, the fuel cell includes a plurality of the first gas channels.

Preferably, a pitch between a first gas channel and a second gas channel that are adjacent to each other is larger than a pitch between first gas channels that are adjacent to each other.

A cell stack device according to a second aspect of the present invention includes any of the above-described fuel cells and a manifold. The manifold includes a gas supply chamber and a gas collection chamber. The manifold is configured to support the proximal end portion of the fuel cell. The at least one first gas channel is connected to the gas supply chamber. The at least one second gas channel is connected to the gas collection chamber.

Advantageous Effects

According to the present invention, the output of a fuel cell can be improved.

DESCRIPTION OF EMBODIMENTS

Figure 1:
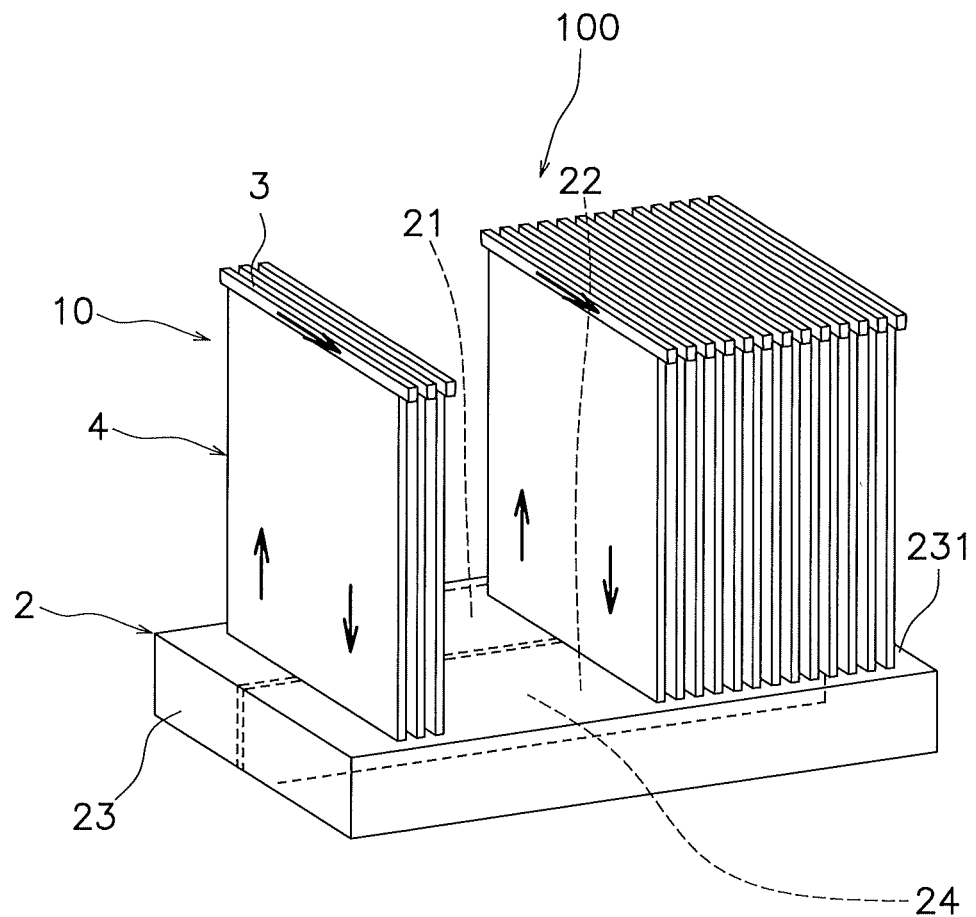
FIG. 1 is a perspective view of a cell stack device.
Figure 1:
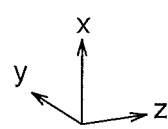
Figure 2:
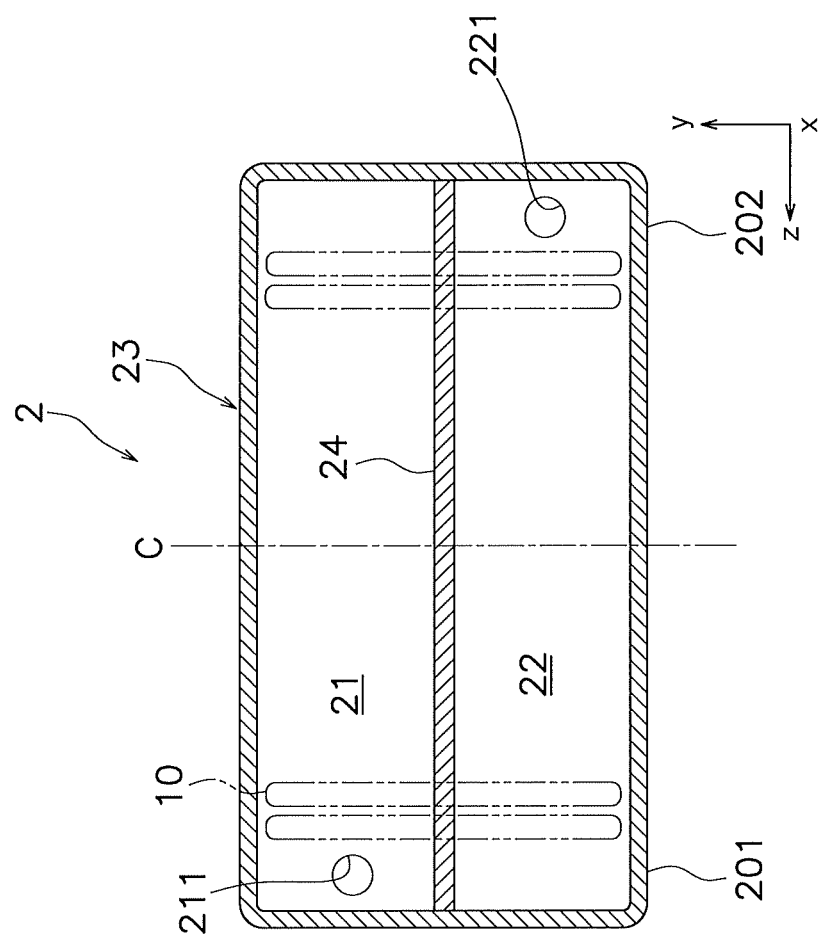
FIG. 2 is a cross-sectional view of a manifold.

Hereinafter, an embodiment of a fuel cell and a cell stack device according to the present invention will be described with reference to the drawings. Note that a solid oxide fuel cell (SOFC) will be described as an example of fuel cells in the present embodiment. FIG. 1 is a perspective view showing a cell stack device and FIG. 2 is a cross-sectional view of a manifold. Note that some fuel cells are omitted in FIGS. 1 and 2.

Cell Stack Device

As shown in FIG. 1, a cell stack device 100 includes a manifold 2 and a plurality of fuel cells 10.

Manifold

As shown in FIG. 2, the manifold 2 is configured to supply gas to the fuel cells 10. Also, the manifold 2 is configured to collect gas ejected from the fuel cells 10. The manifold 2 includes a gas supply chamber 21 and a gas collection chamber 22. Fuel gas is supplied from a fuel gas supply source to the gas supply chamber 21 via a reformer or the like. The gas collection chamber 22 collects offgas from fuel gas used in the fuel cells 10.

The manifold 2 includes a manifold main body 23 and a partition plate 24. The manifold main body 23 has an internal space. The manifold main body 23 has a rectangular parallelepiped shape.

Figure 3:
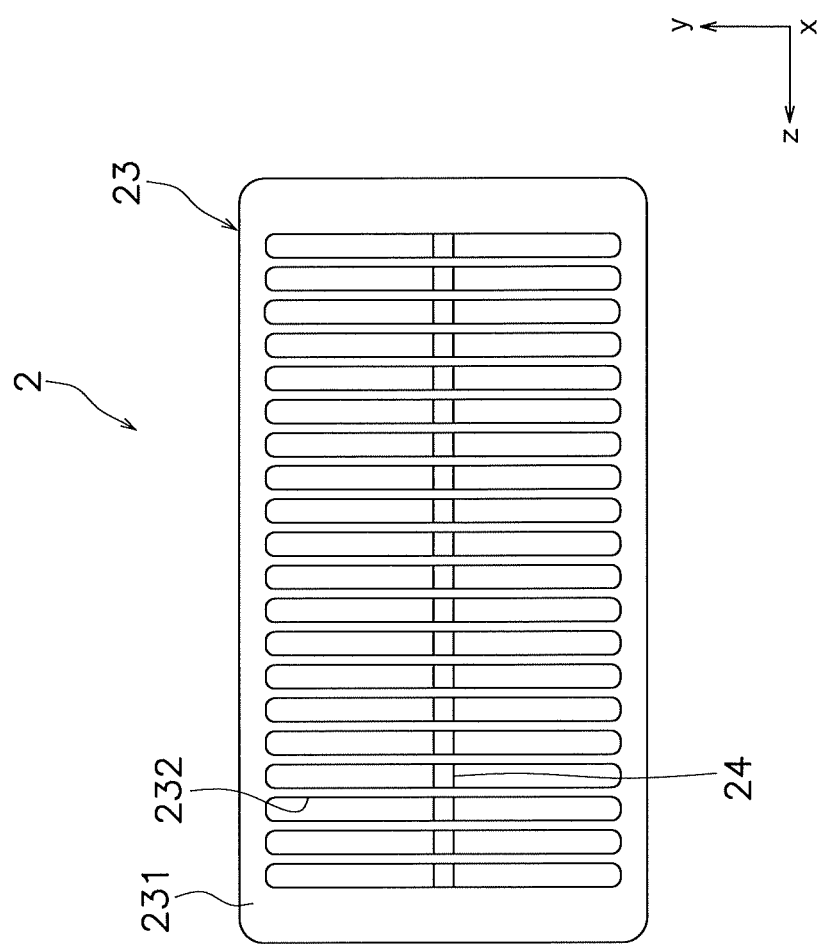
FIG. 3 is a top view of the manifold.

As shown in FIG. 3, a top plate portion 231 of the manifold main body 23 is provided with a plurality of through holes 232. The through holes 232 are arranged at intervals in a length direction (the Z-axis direction) of the manifold main body 23. The through holes 232 extend in a width direction (the Y-axis direction) of the manifold main body 23. The through holes 232 open into the gas supply chamber 21 and the gas collection chamber 22. Note that each through hole 232 may be divided into a portion that opens into the gas supply chamber 21 and a portion that opens into the gas collection chamber 22.

The partition plate 24 partitions the space of the manifold main body 23 into the gas supply chamber 21 and the gas collection chamber 22. Specifically, the partition plate 24 extends in the length direction of the manifold main body 23 at a substantially central portion of the manifold main body 23. Note that, although the partition plate 24 completely partitions the space of the manifold main body 23 in the present embodiment, a gap may be formed between the partition plate 24 and the manifold main body 23.

As shown in FIG. 2, a bottom surface of the gas supply chamber 21 is provided with a gas supply port 211. Also, a bottom surface of the gas collection chamber 22 is provided with a gas ejection port 221. Note that the gas supply port 211 may be formed in a side surface or an upper surface of the gas supply chamber 21 and the gas ejection port 221 may be formed in a side surface or an upper surface of the gas collection chamber 22.

The gas supply port 211 is disposed on a first end portion 201 side with respect to a center C of the manifold 2 in an arrangement direction (the Z-axis direction) of the fuel cells 10, for example. On the other hand, the gas ejection port 221 is disposed on a second end portion 202 side with respect to the center C of the manifold 2 in the arrangement direction (the Z-axis direction) of the fuel cells 10, for example.

Fuel Cell

Figure 4:
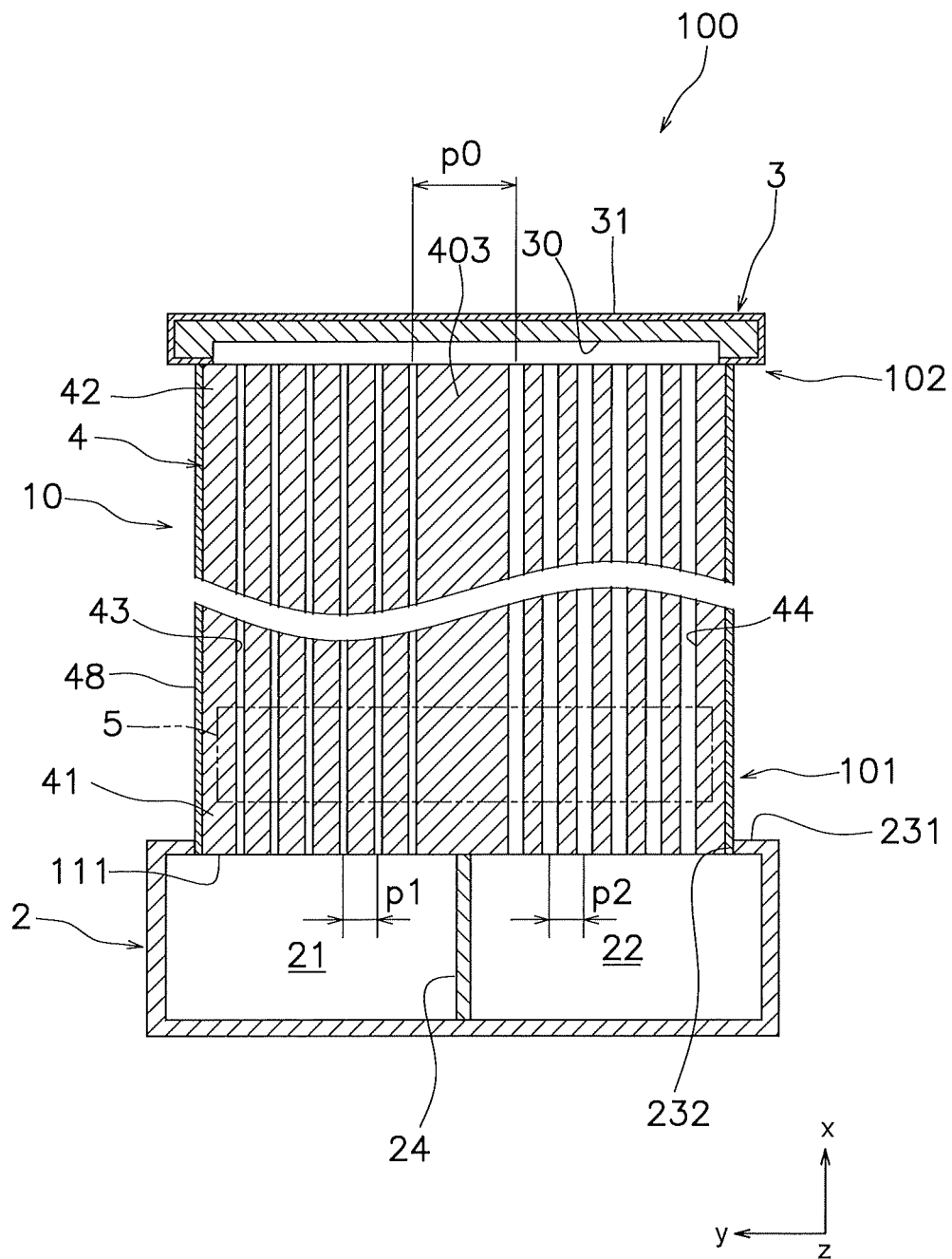
FIG. 4 is a cross-sectional view of the cell stack device.

FIG. 4 is a cross-sectional view of the cell stack device. As shown in FIG. 4, the fuel cell 10 extends upward from the manifold 2. The fuel cell 10 has a proximal end portion 101 and a distal end portion 102. The proximal end portion 101 of the fuel cell 10 is attached to the manifold 2. That is, the manifold 2 supports the proximal end portion 101 of each fuel cell 10. In this embodiment, the proximal end portion 101 of the fuel cell 10 refers to a lower end portion thereof and the distal end portion 102 of the fuel cell 10 refers to an upper end portion thereof.

As shown in FIG. 1, the fuel cells 10 are arranged such that main surfaces of the fuel cells 10 face each other. Also, the fuel cells 10 are arranged at intervals in the length direction (the Z-axis direction) of the manifold 2. That is, the arrangement direction of the fuel cells 10 is along the length direction of the manifold 2. The fuel cells 10 are disposed at equal intervals in the length direction of the manifold 2 in this embodiment but the fuel cells 10 need not be disposed at equal intervals.

Figure 5:
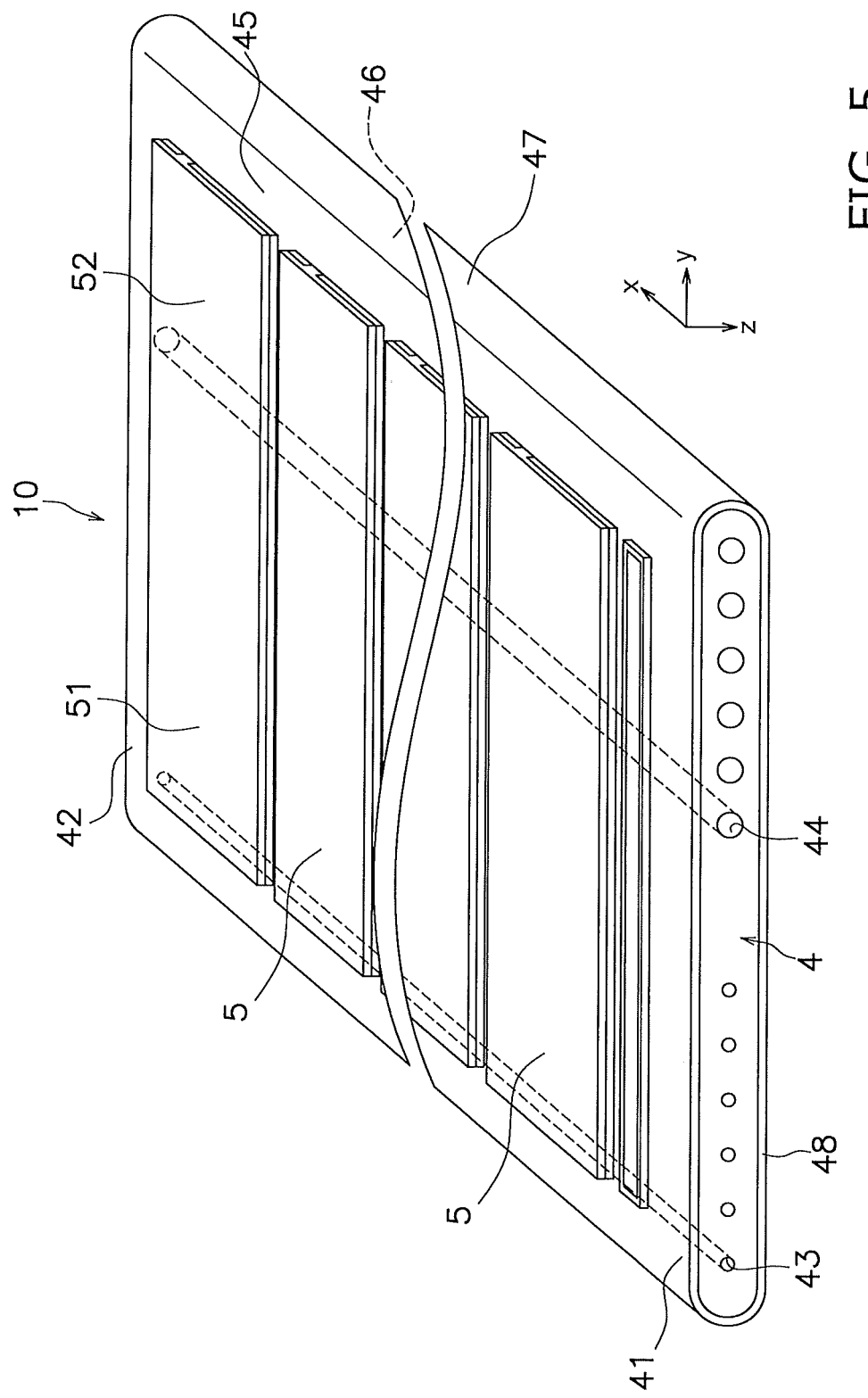
FIG. 5 is a perspective view of a fuel cell.

As shown in FIGS. 4 and 5, the fuel cell 10 includes a support substrate 4, a plurality of first gas channels 43, a plurality of second gas channels 44, and a plurality of power generation element portions 5. Also, the fuel cell 10 includes a connection channel 30.

Support Substrate

The support substrate 4 extends upward from the manifold 2. The support substrate 4 has a flat shape and has a proximal end portion 41 and a distal end portion 42. The proximal end portion 41 and the distal end portion 42 are both end portions of the support substrate 4 in its length direction (the X-axis direction). In this embodiment, the proximal end portion 41 of the support substrate 4 refers to a lower end portion thereof and the distal end portion 42 of the support substrate 4 refers to an upper end portion thereof. Although the length of the support substrate 4 in the length direction (the X-axis direction) is longer than the length of the support substrate 4 in the width direction (the Y-axis direction) in this embodiment, the length of the support substrate 4 in the width direction (the Y-axis direction) may be longer than the length of the support substrate 4 in the length direction (the X-axis direction).

The proximal end portion 41 of the support substrate 4 is attached to the manifold 2. For example, the proximal end portion 41 of the support substrate 4 is attached to the top plate portion 231 of the manifold 2 with the use of a bonding material or the like. Specifically, the proximal end portion 41 of the support substrate 4 is inserted into a through hole 232 formed in the top plate portion 231. Note that the proximal end portion 41 of the support substrate 4 need not be inserted into the through hole 232.

As shown in FIG. 5, the support substrate 4 includes a first main surface 45 and a second main surface 46. The first main surface 45 and the second main surface 46 face away from each other. The first main surface 45 and the second main surface 46 support the power generation element portions 5. The first main surface 45 and the second main surface 46 are oriented in the thickness direction (the Z-axis direction) of the support substrate 4. Also, side surfaces 47 of the support substrate 4 are oriented in the width direction (the Y-axis direction) of the support substrate 4. The side surfaces 47 may be curved.

The support substrate 4 is constituted by a porous material having no electron conductivity. The support substrate 4 is constituted by CSZ (calcia stabilized zirconia), for example. Alternatively, the support substrate 4 may also be constituted by NiO (nickel oxide) and YSZ (8YSZ) (yttria-stabilized zirconia), NiO (nickel oxide) and $Y_2O_3$ (yttria), or MgO (magnesium oxide) and $MgAl_2O_4$ (magnesia alumina spinel). The support substrate 4 has a porosity of about 20% to 60%, for example. The porosity is measured using the Archimedes' method, or through microstructure observation, for example.

The support substrate 4 is covered by a compact layer 48. The compact layer 48 is configured to keep a gas that is diffused from the first gas channels 43 and the second gas channels 44 into the support substrate 4 from being ejected to the outside. In this embodiment, the compact layer 48 covers the first main surface 45, the second main surface 46, and the side surfaces 47 of the support substrate 4. Note that, in this embodiment, the compact layer 48 is constituted by electrolytes 7 and interconnectors 9, which will be described later. The compact layer 48 is more compact than the support substrate 4. For example, the compact layer 48 has a porosity of about 0% to 7%.

First and Second Gas Channels

The first and second gas channels 43 and 44 extend in the support substrate 4. The first and second gas channels 43 and 44 extend in the length direction (the X-axis direction) of the support substrate 4. That is, the first and second gas channels 43 and 44 extend from the proximal end portion 101 of the fuel cell 10 toward the distal end portion 102 thereof. The first and second gas channels 43 and 44 extend substantially in parallel to each other. Note that the first and second gas channels 43 and 44 pass through the support substrate 4.

In a state in which the fuel cells 10 are attached to the manifold 2, the first gas channels 43 are connected to the gas supply chamber 21 on the proximal end portion 101 side, and the second gas channels 44 are connected to the gas collection chamber 22 of the manifold 2 on the proximal end portion 101 side.

The first gas channels 43 are disposed at intervals in the width direction (the Y-axis direction) of the support substrate 4. Note that the first gas channels 43 are preferably disposed at equal intervals. Also, the second gas channels 44 are disposed at intervals in the width direction (the Y-axis direction) of the support substrate 4. Note that the second gas channels 44 are preferably disposed at equal intervals.

As shown in FIG. 4, a pitch p1 between adjacent first gas channels 43 is about 1 to 5 mm, for example. The pitch p1 between adjacent first gas channels 43 indicates the distance between centers of adjacent first gas channels 43. For example, an average value of pitches obtained by measuring pitches of first gas channels 43 in the proximal end portion 41, a central portion, and the distal end portion 42 of the support substrate 4 may be used as the pitch p1 between first gas channels 43.

A pitch p2 between adjacent second gas channels 44 is about 1 to 5 mm, for example. The pitch p2 between adjacent second gas channels 44 indicates the distance between centers of adjacent second gas channels 44. For example, an average value of pitches obtained by measuring pitches of second gas channels 44 in the proximal end portion 41, the central portion, and the distal end portion 42 of the support substrate 4 may be used as the pitch p2 between second gas channels 44. Note that the pitch p2 between second gas channels 44 is preferably substantially equal to the pitch p1 between first gas channels 43.

A pitch p0 between a first gas channel 43 and a second gas channel 44 that are adjacent to each other is about 1 to 10 mm, for example. The pitch p0 between the first gas channel 43 and the second gas channel 44 that are adjacent to each other indicates the distance between the center of the first gas channel 43 and the center of the second gas channel 44. For example, the pitch p0 can be measured at a proximal end surface 111 of the fuel cell 10.

The pitch p0 between the first gas channel 43 and the second gas channel 44 that are adjacent to each other is larger than the pitch p1 between adjacent first gas channels 43. Also, the pitch p0 between the first gas channel 43 and the second gas channel 44 that are adjacent to each other is larger than the pitch p2 between adjacent second gas channels 44.

As a result of making the pitch p0 between the first gas channel 43 and the second gas channel 44 larger than the pitch p1 between first gas channels 43 and the pitch p2 between second gas channels 44 in this manner, the first gas channel 43 and the second gas channel 44 that are adjacent to each other are separated from each other. A region between the first gas channel 43 and the second gas channel 44 is referred to as a boundary region 403.

Figure 6:
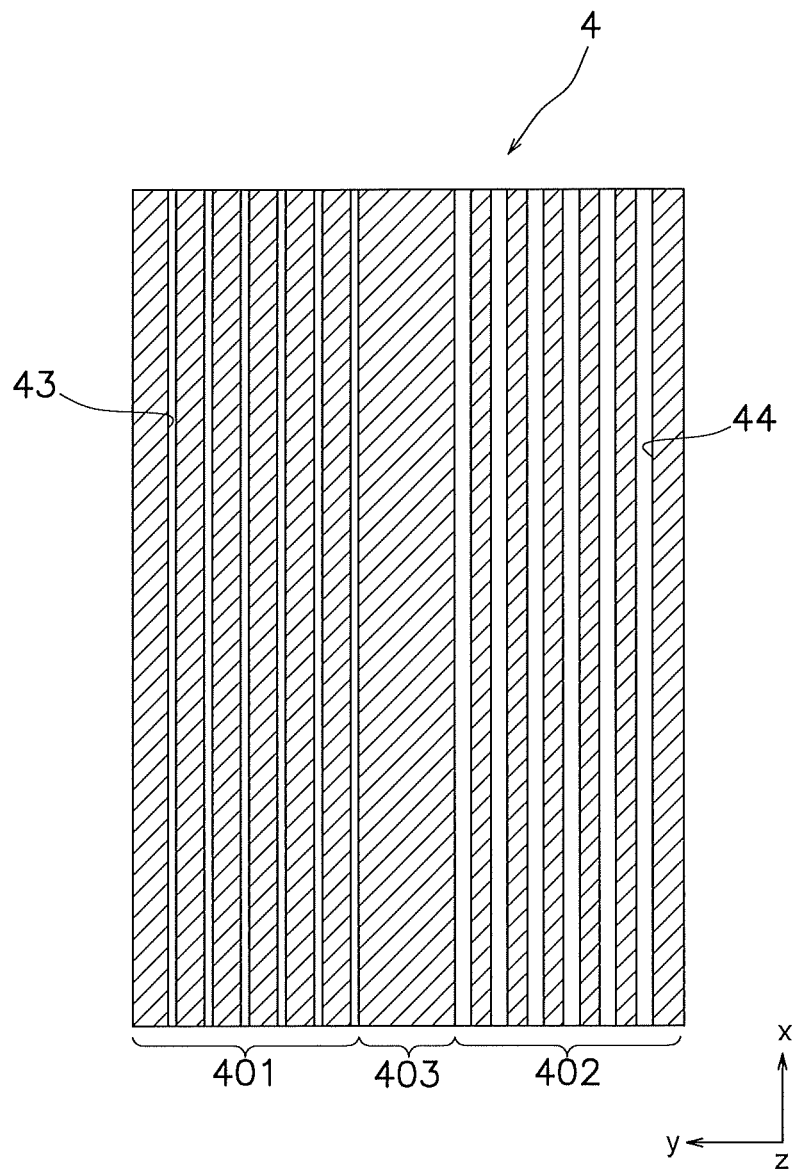
FIG. 6 is a cross-sectional view of a support substrate.

As shown in FIG. 6, the support substrate 4 includes a first region 401, a second region 402, and the boundary region 403. The first region 401, the second region 402, and the boundary region 403 are formed by defining the support substrate 4 in the width direction (the Y-axis direction). The first region 401 is a region in which the first gas channels 43 are formed. The second region 402 is a region in which the second gas channels 44 are formed. The boundary region 403 is a region between the first region 401 and the second region 402. The first region 401 and the second region 402 are separated from each other by the boundary region 403.

The first gas channels 43 and the second gas channels 44 are connected to each other at the distal end portion 102 side of the fuel cell 10. Specifically, the first gas channels 43 and the second gas channels 44 are connected to each other via the connection channel 30 of a connection member 3.

Cross-Sectional Areas of First and Second Gas Channels

The sum of the cross-sectional areas of the first gas channels 43 is smaller than the sum of the cross-sectional areas of the second gas channels 44. Therefore, the sum of the pressure losses of gas flowing through the first gas channels 43 is larger than the sum of the pressure losses of gas flowing through the second gas channels 44. Note that, in this embodiment, each first gas channel 43 has a smaller cross-sectional area than that of each second gas channel 44.

A ratio (S1/S2) of the sum (S1) of the cross-sectional areas of the first gas channels 43 to the sum (S2) of the cross-sectional areas of the second gas channels 44 is preferably set to 0.92 or less, for example, from the standpoint of improving the output. Also, the ratio (S1/S2) may be set to 0.02 or more, for example, from the standpoint of production, although this is not a particular limitation. Note that the cross-sectional area of each first gas channel 43 may be set to about 0.1 to 25 $mm^2$, for example. Also, the cross-sectional area of each second gas channel 44 may be set to about 0.5 to 30 $mm^2$, for example.

Note that the cross-sectional area of the first gas channel 43 refers to the cross-sectional area of the first gas channel 43 in the cross-section obtained by cutting the first gas channel 43 along a plane (the YZ plane) orthogonal to the direction (the X-axis direction) in which the first gas channel 43 extends. Also, an average value of the cross-sectional area at any position on the proximal end portion 101 side, the cross-sectional area at any position of a central portion, and the cross-sectional area at any position on the distal end portion 102 side can be used as the cross-sectional area of the first gas channel 43.

Also, the cross-sectional area of the second gas channel 44 refers to the cross-sectional area of the second gas channel 44 in the cross-section obtained by cutting the second gas channel 44 along a plane (the YZ plane) orthogonal to the direction (the X-axis direction) in which the second gas channel 44 extends. Also, an average value of the cross-sectional area at any position on the proximal end portion 101 side, the cross-sectional area at any position of a central portion, and the cross-sectional area at any position on the distal end portion 102 side can be used as the cross-sectional area of the second gas channel 44.

Power Generation Element Portion

The power generation element portions 5 are each supported on the first main surface 45 or the second main surface 46 of the support substrate 4. Note that the number of power generation element portions 5 formed on the first main surface 45 and the number of power generation element portions 5 formed on the second main surface 46 may be the same as or different from each other. Also, the power generation element portions 5 may have different sizes from each other.

The power generation element portions 5 are disposed at intervals in the direction (the X-axis direction) in which the first and second gas channels 43 and 44 extend. Specifically, the power generation element portions 5 are disposed at intervals from the proximal end portion 101 toward the distal end portion 102, on the support substrate 4. Note that the power generation element portions 5 are connected to each other in series by the interconnectors 9.

The power generation element portions 5 each extend in the width direction (the Y-axis direction) of the support substrate 4. The power generation element portions 5 are each divided into a first portion 51 and a second portion 52 in the width direction of the support substrate 4. Note that there is no strict boundary between the first portion 51 and the second portion 52. For example, in a state in which the fuel cells 10 are attached to the manifold 2, in a longitudinal view (the X-axis view) of the support substrate 4, a portion overlapping the boundary between the gas supply chamber 21 and the gas collection chamber 22 can be referred to as a boundary portion between the first portion 51 and the second portion 52.

In the thickness view (the Z-axis view) of the support substrate 4, the first gas channels 43 overlap the first portions 51 of the power generation element portions 5. Thus, fuel gas is supplied mainly from the first gas channels 43 to the first portions 51 of the power generation element portions 5. Also, in the thickness view (the Z-axis view) of the support substrate 4, the second gas channels 44 overlap the second portions 52 of the power generation element portions 5. Thus, fuel gas is supplied mainly from the second gas channels 44 to the second portions 52 of the power generation element portions 5. Note that some of the first gas channels 43 need not overlap the first portions 51. Similarly, some of the second gas channels 44 need not overlap the second portions 52.

Figure 7:
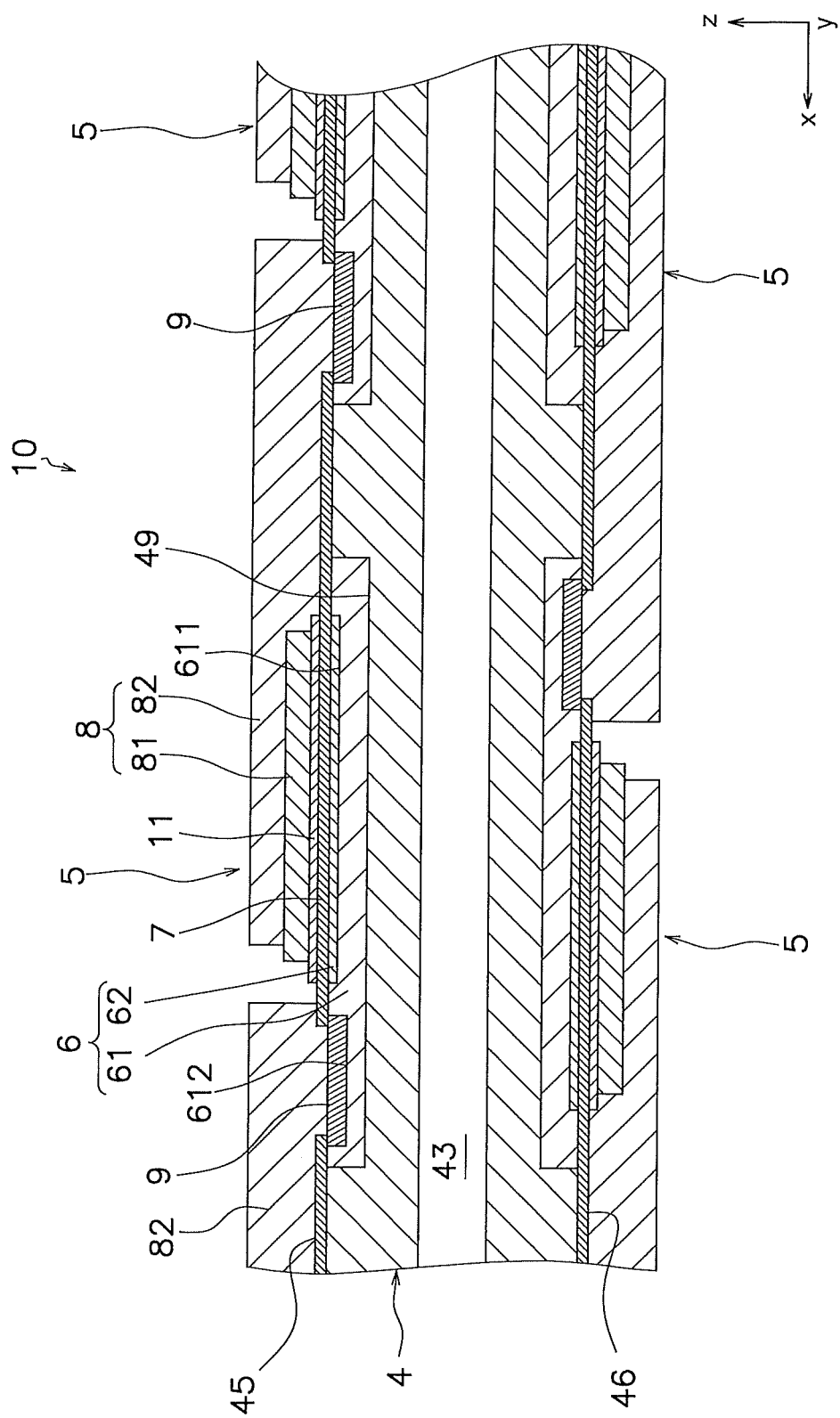
FIG. 7 is a cross-sectional view of a fuel cell.

FIG. 7 is a cross-sectional view of the fuel cell 10 cut along the first gas channel 43. Note that the cross-sectional view of the fuel cell 10 cut along the second gas channel 44 is the same as that in FIG. 7, except that the cross-sectional area of the second gas channel 44 is different from that in FIG. 7.

The power generation element portions 5 each include a fuel electrode 6, an electrolyte 7, and an air electrode 8. Also, the power generation element portions 5 each further include a reaction preventing film 11. The fuel electrode 6 is a sintered body constituted by a porous material having an electron conductivity. The fuel electrode 6 includes a fuel electrode current collector portion 61 and a fuel electrode active portion 62.

The fuel electrode current collector portion 61 is disposed in a recess 49. The recess 49 is formed in the support substrate 4. Specifically, the recess 49 is filled with the fuel electrode current collector portion 61 and the fuel electrode current collector portion 61 has an outer shape that is the same as the shape of the recess 49. Each fuel electrode current collector portion 61 has a first recess 611 and a second recess 612. The fuel electrode active portion 62 is disposed in the first recess 611. Specifically, the first recess 611 is filled with the fuel electrode active portion 62.

The fuel electrode current collector portion 61 may be constituted by NiO (nickel oxide) and YSZ (8YSZ) (yttria-stabilized zirconia), for example. Alternatively, the fuel electrode current collector portion 61 may also be constituted by NiO (nickel oxide) and $Y_2O_3$ (yttria), or NiO (nickel oxide) and CSZ (calcia stabilized zirconia). The fuel electrode current collector portion 61 has a thickness of about 50 to 500 μm and the recess 49 has a depth of about 50 to 500 μm.

The fuel electrode active portion 62 may be constituted by NiO (nickel oxide) and YSZ (8YSZ) (yttria-stabilized zirconia), for example. Alternatively, the fuel electrode active portion 62 may also be constituted by NiO (nickel oxide) and GDC (gadolinium doped ceria). The fuel electrode active portion 62 has a thickness of 5 to 30 μm.

The electrolyte 7 is disposed covering the fuel electrode 6. Specifically, the electrolyte 7 extends in the length direction from one interconnector 9 to another interconnector 9. That is, the electrolytes 7 and the interconnectors 9 are disposed in an alternating manner in the length direction (the X-axis direction) of the support substrate 4. Also, the electrolytes 7 cover the first main surface 45, the second main surface 46, and the side surfaces 47 of the support substrate 4.

The electrolyte 7 is more compact than the support substrate 4. For example, the electrolyte 7 has a porosity of about 0% to 7%. The electrolyte 7 is a sintered body constituted by a compact material having an ionic conductivity and no electron conductivity. The electrolyte 7 may be constituted by YSZ (8YSZ) (yttria-stabilized zirconia), for example. Alternatively, the electrolyte 7 may also be constituted by LSGM (lanthanum gallate). The electrolyte 7 has a thickness of about 3 to 50 μm, for example.

The reaction preventing film 11 is a sintered body constituted by a compact material. The reaction preventing film 11 has a shape that is substantially the same as that of the fuel electrode active portion 62, in a plan view. The reaction preventing film 11 is disposed at a position corresponding to the fuel electrode active portion 62 via the electrolyte 7. The reaction preventing film 11 is provided in order to suppress the occurrence of a phenomenon in which a reaction layer with a large electric resistance is formed at an interface between the electrolyte 7 and an air electrode active portion 81 through a reaction between YSZ in the electrolyte 7 and Sr in the air electrode active portion 81. The reaction preventing film 11 may be constituted by GDC=(Ce, Gd) $O_2$ (gadolinium doped ceria), for example. The reaction preventing film 11 has a thickness of about 3 to 50 μm, for example.

The air electrode 8 is disposed so as to sandwich the electrolyte 7 in cooperation with the fuel electrode 6. The air electrode 8 includes the air electrode active portion 81 and an air electrode current collector portion 82.

The air electrode active portion 81 is disposed on the reaction preventing film 11. The air electrode active portion 81 has an oxygen ion conductivity and electron conductivity. A substance that has an oxygen ion conductivity is contained at a higher ratio in the air electrode active portion 81 than in the air electrode current collector portion 82. Specifically, a volume ratio of the substance having an oxygen ion conductivity to the whole volume of the air electrode active portion 81 excluding pores is higher than a volume ratio of the substance having an oxygen ion conductivity to the whole volume of the air electrode current collector portion 82 excluding pores.

The air electrode active portion 81 is constituted by a porous material. The air electrode active portion 81 is a sintered body. The air electrode active portion 81 may be constituted by LSCF=(La, Sr) (Co, Fe)$O_3$ (lanthanum strontium cobalt ferrite), for example. Alternatively, the air electrode active portion 81 may also be constituted by LSF=(La, Sr)FeO$_3$ (lanthanum strontium ferrite), LNF=La(Ni, Fe)$O_3$ (lanthanum nickel ferrite), LSC=(La, Sr) CoO$_3$ (lanthanum strontium cobaltite), or the like. Also, the air electrode active portion 81 may be constituted by two layers of a first layer (inner layer) constituted by LSCF and a second layer (outer layer) constituted by LSC. The air electrode active portion 81 has a thickness of 10 to 100 μm, for example.

The air electrode current collector portion 82 is disposed on the air electrode active portion 81. The air electrode current collector portion 82 extends from the air electrode active portion 81 toward an adjacent power generation element portion 5. The air electrode current collector portion 82 is electrically connected to the fuel electrode current collector portion 61 of the adjacent power generation element portion 5 via the interconnector 9. Note that the fuel electrode current collector portion 61 and the air electrode current collector portion 82 extend toward opposite sides from each other from a power generation region in the length direction (the X-axis direction) of the support substrate 4. Note that the power generation region refers to a region in which the fuel electrode active portion 62, the electrolyte 7, and the air electrode active portion 81 overlap each other in a plan view (the Z-axis view).

The air electrode current collector portion 82 is constituted by a porous material having an electron conductivity. The air electrode current collector portion 82 is a sintered body. The air electrode current collector portion 82 preferably has a higher electron conductivity than that of the air electrode active portion 81. A configuration in which the air electrode current collector portion 82 has an oxygen ion conductivity and a configuration in which the air electrode current collector portion 82 does not have an oxygen ion conductivity are both possible.

The air electrode current collector portion 82 may be constituted by LSCF=(La, Sr) (Co, Fe)$O_3$ (lanthanum strontium cobalt ferrite), for example. Alternatively, the air electrode current collector portion 82 may also be constituted by LSC=(La, Sr)$CoO_3$ (lanthanum strontium cobaltite). Alternatively, the air electrode current collector portion 82 may also be constituted by Ag (silver) or Ag—Pd (silver-palladium alloy). Note that the air electrode current collector portion 82 has a thickness of about 50 to 500 µm, for example.

Interconnector

The interconnector 9 is configured to electrically connect power generation element portions 5 that are adjacent to each other in the X-axis direction to each other. The interconnector 9 electrically connects the fuel electrode 6 of one of the adjacent power generation element portions 5 and the air electrode 8 of the other power generation element portion 5 to each other. Specifically, the interconnector 9 electrically connects the fuel electrode current collector portion 61 of the one power generation element portion 5 and the air electrode current collector portion 82 of the other power generation element portion 5 to each other.

Thus, the power generation element portions 5 are connected to each other in series by the interconnectors 9 from the distal end portion 102 of the fuel cell 10 to the proximal end portion 101 thereof, on each of the first and second main surfaces 45 and 46.

The interconnector 9 is disposed in the second recess 612 of the fuel electrode current collector portion 61, for example. Specifically, the interconnector 9 is embedded in the second recess 612 (the second recess 612 is filled with the interconnector 9). The interconnector 9 is a sintered body constituted by a compact material having an electron conductivity. The interconnector 9 is more compact than the support substrate 4. For example, the interconnector 9 has a porosity of about 0% to 7%. The interconnector 9 may be constituted by $LaCrO_3$ (lanthanum chromite), for example. Alternatively, the interconnector 9 may also be constituted by (Sr, La)$TiO_3$ (strontium titanate). The interconnector 9 has a thickness of 10 to 100 µm, for example.

Figure 8:
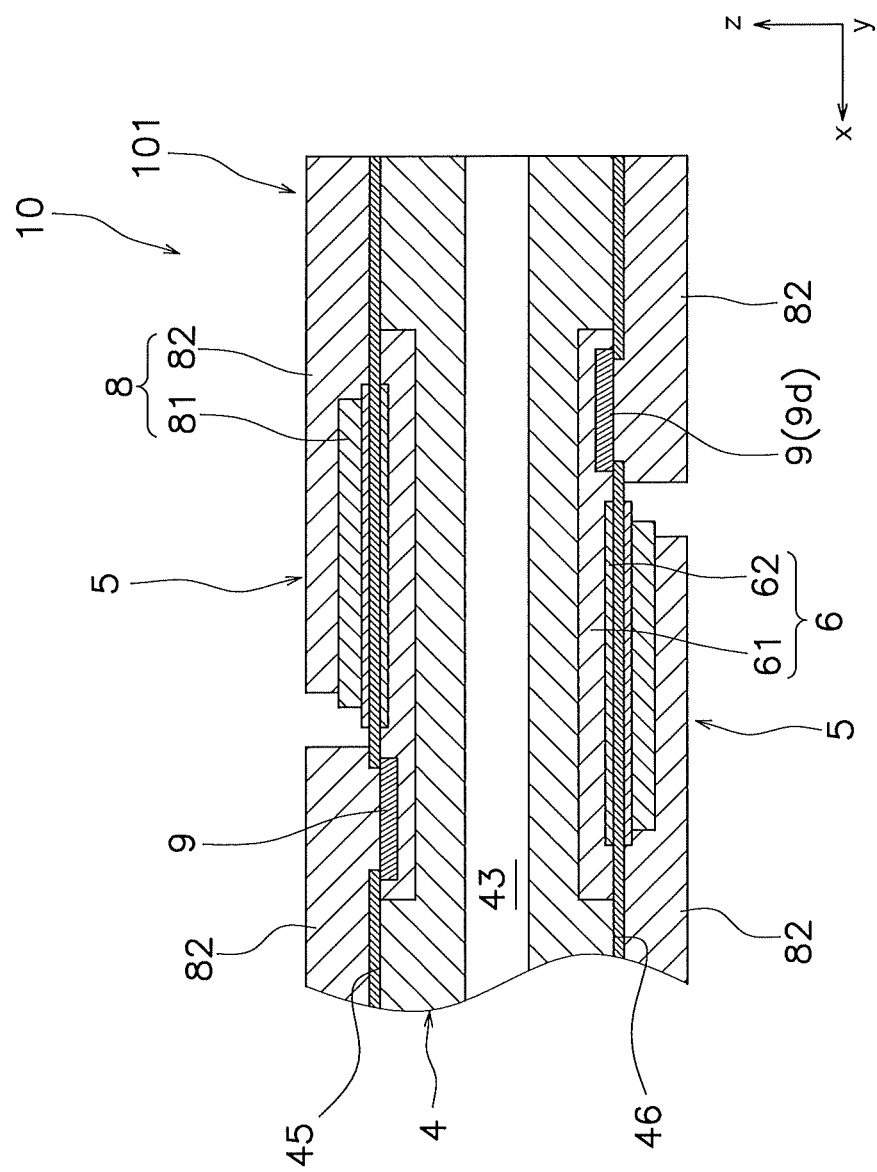
FIG. 8 is a cross-sectional view of a proximal end portion of a fuel cell.

As shown in FIG. 8, an interconnector 9d that is disposed closest to the proximal end side in each fuel cell 10 electrically connects the power generation element portions 5 disposed on the first main surface 45 and the power generation element portions 5 disposed on the second main surface to each other. Note that a pair of power generation element portions 5 that are disposed closest to the proximal end side respectively on the main surfaces 45 and 46 in each fuel cell 10 are adjacent to each other via the interconnector 9d. Also, in this embodiment, the interconnect or 9d, which is disposed closest to the proximal end side on the second ma in surface 46, is the interconnector that is disposed closest to the proximal end side in each fuel cell 10.

The air electrode current collector portion 82 of the power generation element portion 5 that is disposed closest to the proximal end side on the first main surface 45 extends from the first main surface 45 to the second main surface 46 via the side surfaces 47. That is, the air electrode current collector portion 82 of this power generation element portion 5 disposed closest to the proximal end side extends in the shape of a loop. The interconnector 9d disposed closest to the proximal end side on the second main surface 46 electrically connects the air electrode current collector portion 82 extending from the first main surface 45 to the second main surface 46 and the fuel electrode current collector portion 61 of the power generation element portion 5 that is disposed closest to the proximal end side on the second main surface 46 to each other.

Thus, the plurality of power generation element portions 5 that are connected to each other in series on the first main surface 45 and the plurality of power generation element portions 5 that are connected to each other in series on the second main surface 46 are connected to each other in series by the interconnector 9d at the proximal end portion 101 of the fuel cell 10.

Connection Member

As shown in FIG. 4, the connection member 3 is attached to the distal end portion 42 of the support substrate 4. The connection member 3 includes the connection channel 30. The connection channel 30 connects the first gas channels 43 and the second gas channels 44 to each other. That is, the first gas channels 43 and the second gas channels 44 are connected to each other via the connection channel 30.

The connection channel 30 extends in the width direction (the Y-axis direction) of the fuel cell 10 at the distal end portion 102 of the fuel cell 10. That is, the connection channel 30 extends in a direction that intersects the first and second gas channels 43 and 44. The first gas channels 43 and the second gas channels 44 are each connected to the connection channel 30 at the distal end portion 102.

The connection member 3 is preferably joined to the support substrate 4. Also, the connection member 3 is preferably formed integrally with the support substrate 4. The number of connection channels 30 is smaller than the number of first gas channels 43. In this embodiment, the plurality of first gas channels 43 and the plurality of second gas channels 44 are connected to each other by a single connection channel 30.

The connection member 3 is a porous member, for example. Also, the connection member 3 includes a compact layer 31 constituting the outer surface thereof. The compact layer 31 is more compact than the main body of the connection member 3. For example, the compact layer 31 has a porosity of about 0% to 7%. This compact layer 31 may be made of the same material as the connection member 3, a material used in the above-described electrolyte 7, crystallized glass, or the like.

Current Collector Member

Figure 9:
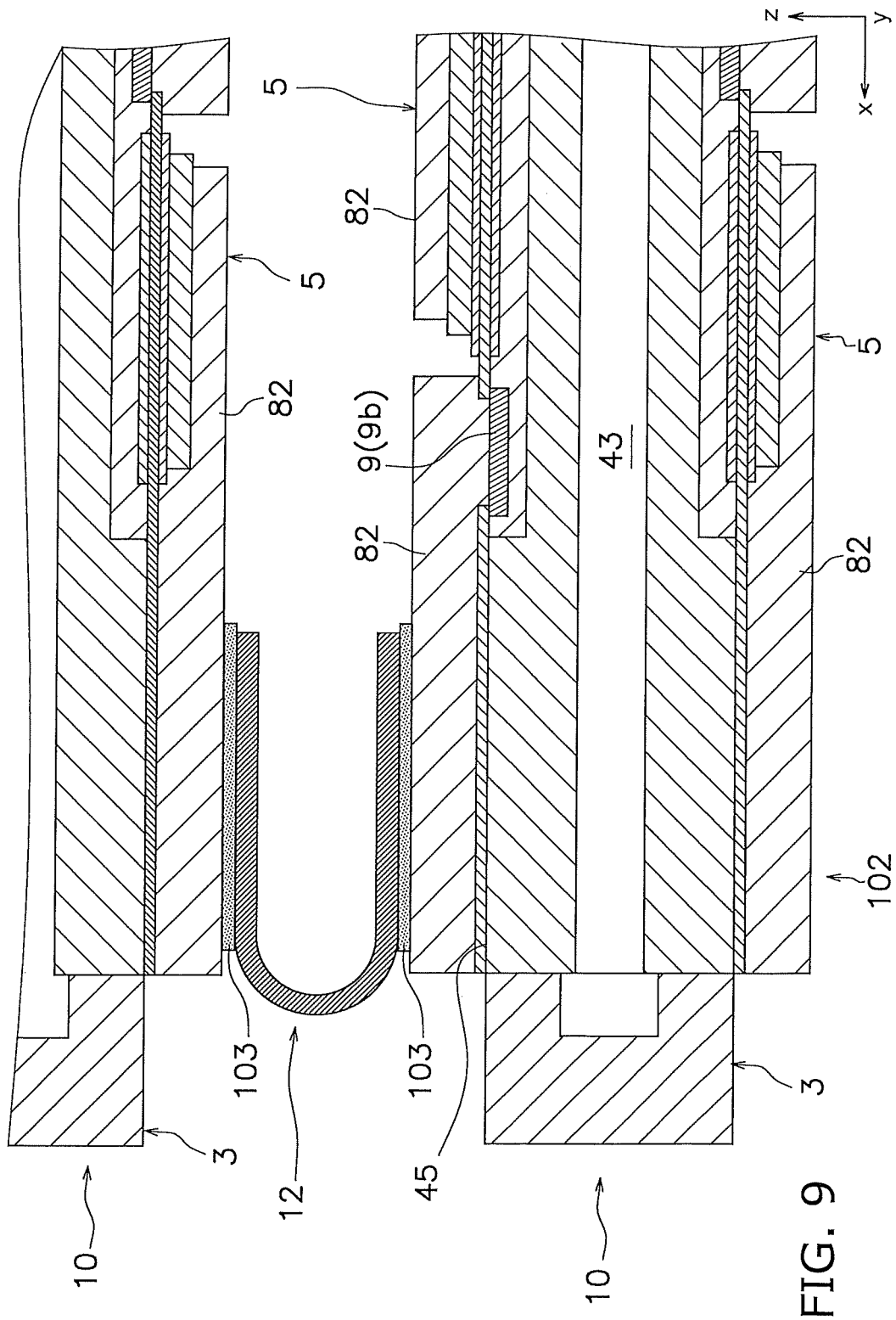
FIG. 9 is a cross-sectional view of a distal end portion of a fuel cell.

As shown in FIG. 9, a current collector member 12 is disposed between adjacent fuel cells 10. The current collector member 12 electrically connects adjacent fuel cells 10 to each other. The current collector member 12 joins together the distal end portions 102 of the adjacent fuel cells 10. For example, the current collector member 12 is disposed closer to the distal end side, compared to the power generation element portion 5 that is disposed closest to the distal end side out of the plurality of power generation element portions 5 disposed on both of the main surfaces of the support substrate 4. The current collector member 12 electrically connects power generation element portions 5 that are disposed closest to the distal end side respectively on the adjacent fuel cells 10 to each other. Note that power generation element portions 5 that are disposed closest to the distal end side respectively on the main surfaces 45 and 46 of each fuel cell 10 are each adjacent to the power generation element portion 5 that is disposed closest to the distal end side on the adjacent fuel cell 10.

The current collector member 12 is joined to the air electrode current collector portions 82 extending from the power generation element portions 5 via an electrically conductive material 103. A well-known electrically conductive ceramic or the like can be used as the electrically conductive material 103. For example, the electrically conductive material 103 may be constituted by at least one material selected from $(Mn, Co)_3O_4$, $(La, Sr)MnO_3$, $(La, Sr)(Co, Fe)O_3$, and the like.

Thus, on each fuel cell 10, an interconnector 9b that is disposed closest to the distal end side electrically connects the power generation element portions 5 of a pair of fuel cells 10 that are adjacent to each other, via the current collector member 12 and the air electrode current collector portions 82. In this embodiment, the interconnector 9 that is disposed closest to the distal end side on the first main surface 45 is the interconnector disposed closest to the distal end side on each fuel cell 10.

Method for Generating Power

In the cell stack device 100 configured as described above, fuel gas is supplied to the gas supply chamber 21 of the manifold 2 and the fuel cells 10 are exposed to a gas containing oxygen, such as air. For example, air is supplied toward the fuel cells 10 from above. Then, a chemical reaction indicated by Equation (1) below occurs in the air electrode 8, a chemical reaction indicated by Equation (2) below occurs in the fuel electrode 6, and a current flows.

$$(½).O_2 + 2e^- \rightarrow O^{2-} \quad (1)$$

$$H_2 + O^{2-} \rightarrow H_2O + 2e^- \quad (2)$$

Specifically, fuel gas supplied to the gas supply chamber 21 flows through the first gas channels 43 of the fuel cells 10 and the chemical reaction indicated by Equation (2) above occurs in the fuel electrodes 6 of the power generation element portions 5. Unreacted fuel gas in the fuel electrodes 6 leaves the first gas channels 43 and is supplied to the second gas channels 44 via the connection channel 30 of the connection member 3. Then, the fuel gas supplied to the second gas channels 44 undergoes the chemical reaction indicated by Equation (2) above in the fuel electrodes 6 again. Unreacted fuel gas in the fuel electrodes 6 in a process in which the fuel gas flows through the second gas channels 44 is collected in the gas collection chamber 22 of the manifold 2.

Variations

Although an embodiment of the present invention has been described above, the present invention is not limited thereto and various modifications can be made without departing from the spirit of the present invention.

Variation 1

Figure 10:
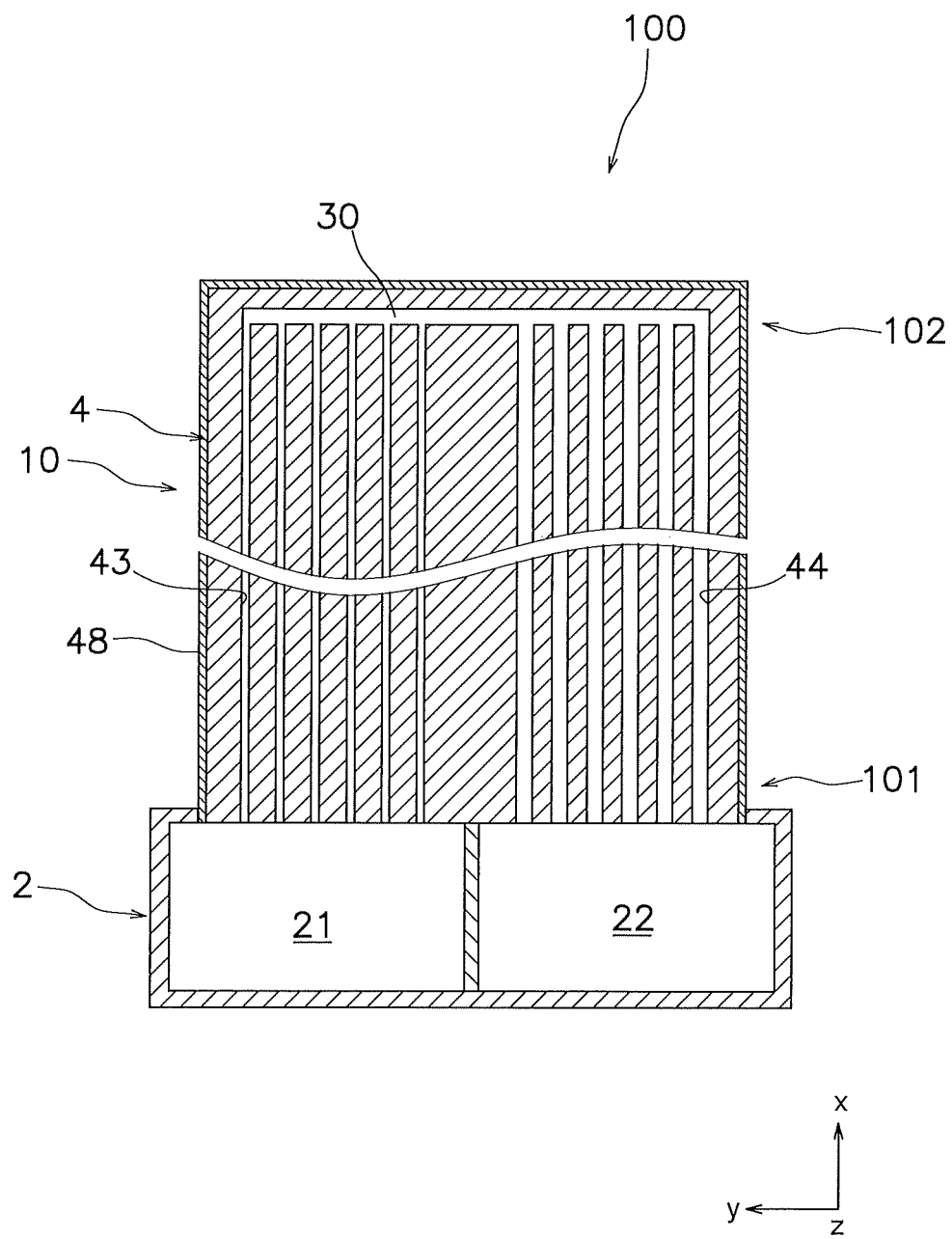
FIG. 10 is a cross-sectional view of a cell stack device according to a variation.

Although the first gas channels 43 and the second gas channels 44 are connected to each other by the connection channel 30 of the connection member 3 in the above-described embodiment, the present invention is not limited to this configuration. For example, the connection channel 30 may be formed in the support substrate 4 as shown in FIG. 10. In this case, the cell stack device 100 need not include the connection member 3. The first gas channels 43 and the second gas channels 44 are connected to each other by the connection channel 30 formed in the support substrate 4.

Variation 2

Although the support substrate 4 includes a plurality of first gas channels 43 in the above-described embodiment, a configuration is also possible in which the support substrate 4 includes only a single first gas channel 43. In this case, the sum of the cross-sectional areas of first gas channels 43 means the cross-sectional area of the single first gas channel 43. Similarly, although the support substrate 4 includes a plurality of second gas channels 44, a configuration is also possible in which the support substrate 4 includes only a single second gas channel 44. In this case, the sum of the cross-sectional areas of second gas channels 44 means the cross-sectional area of the single second gas channel 44.

Variation 3

The first gas channels 43 may have different cross-sectional areas from each other. Also, the second gas channels 44 may have different cross-sectional areas from each other.

Variation 4

Figure 11:
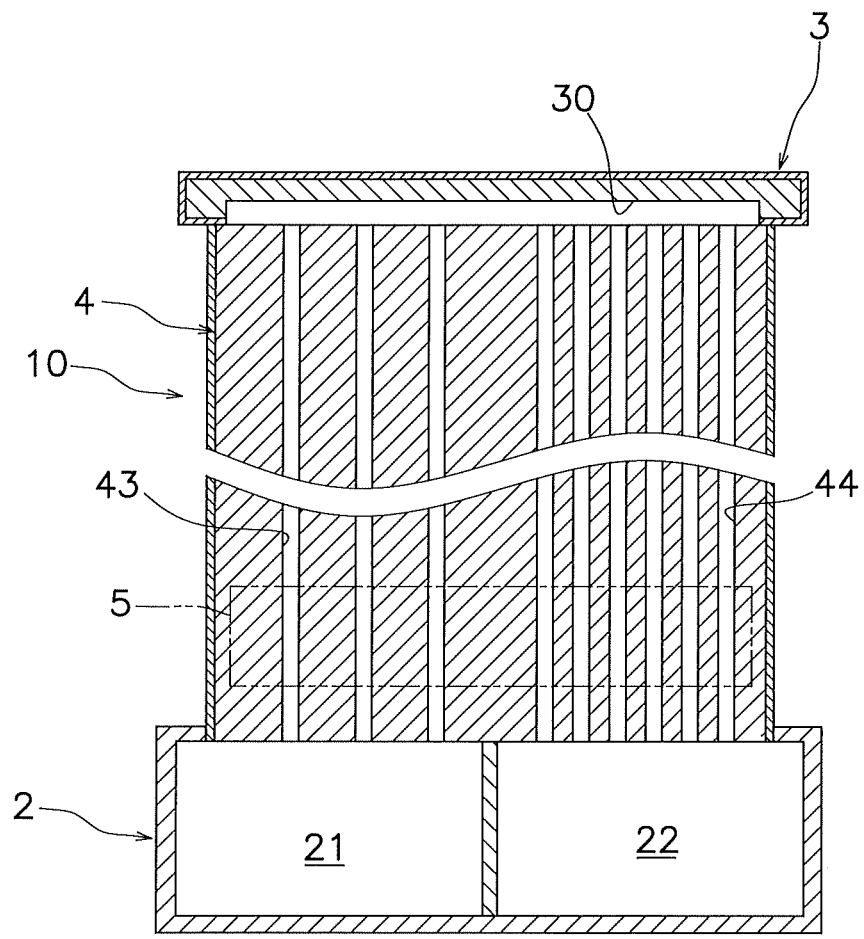
FIG. 11 is a cross-sectional view of a cell stack device according to a variation.

Although the number of first gas channels 43 is the same as the number of second gas channels 44 in the above-described embodiment, the number of first gas channels 43 is not limited thereto. For example, as shown in FIG. 11, the number of first gas channels 43 may be smaller than the number of second gas channels 44. That is, the number of gas channels connected to the gas supply chamber 21 may be smaller than the number of gas channels connected to the gas collection chamber 22. In this case, each first gas channel 43 may have the same cross-sectional area as each of the second gas channels 44. Also, each first gas channel 43 may have a larger cross-sectional area than that of each of the second gas channels 44, as long as the sum of the cross-sectional areas of the first gas channels 43 is not equal to or larger than the sum of the cross-sectional areas of the second gas channels 44.

Figure 12:
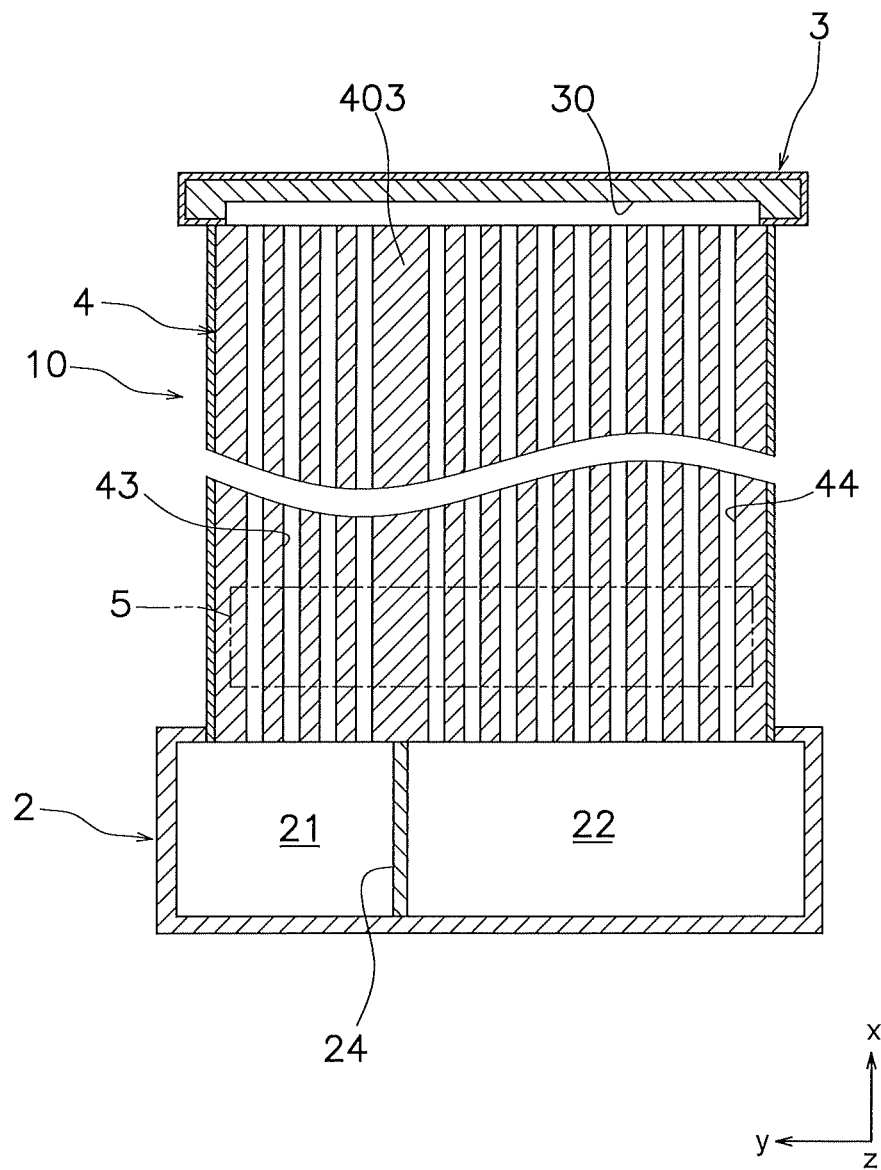
FIG. 12 is a cross-sectional view of a cell stack device according to a variation.

Note that, as a result of expanding the pitch p1 between the first gas channels 43, the number of first gas channels 43 is made smaller than the number of second gas channels 44 in the configuration shown in FIG. 11, but in the cell stack device 100, the number of first gas channels 43 may be made smaller than the number of second gas channels 44 with the use of another configuration. For example, as shown in FIG. 12, the number of first gas channels 43 may be made smaller than the number of second gas channels 44 by making the first region 401 smaller than the second region 402. In this case, the boundary region 403 is located on the first region 401 side in the width direction (the Y-axis direction) with respect to the center of the support substrate 4. Also, the manifold 2 is configured such that the gas supply chamber 21 is smaller than the gas collection chamber 22. For example, as a result of moving the partition plate 24 toward the gas supply chamber 21 with respect to the center, the gas supply chamber 21 can be made smaller than the gas collection chamber 22.

Variation 5

Although the fuel cells 10 are configured to extend upward from the manifold 2 in the above-described embodiment, the present invention is not limited to this configuration. For example, the fuel cells 10 may extend downward from the manifold 2.

Variation 6

Although, as a result of partitioning one manifold main body 23 with use of the partition plate 24, the gas supply chamber 21 and the gas collection chamber 22 are defined in the manifold 2 of the above-described embodiment, the configuration of the manifold 2 is not limited thereto. For example, the manifold 2 can also be constituted by two manifold main bodies 23. In this case, one manifold main body 23 includes the gas supply chamber 21 and the other manifold main body 23 includes the gas collection chamber 22.

Examples

Hereinafter, the present invention will be more specifically described with the use of examples and comparative examples. Note that the present invention is not limited to the examples below.

Sample No. 1 to Sample No. 10 were produced by changing a ratio (S1/S2) of the sum (S1) of the cross-sectional areas of the first gas channels 43 to the sum (S2) of the cross-sectional areas of the second gas channels 44 as shown in Table 1, in a cell stack device 100 having a configuration as shown in FIG. 12. Note that, in the examples, the sum (S1) of the cross-sectional areas of the first gas channels 43 and the sum (S2) of the cross-sectional areas of the second gas channels 44 are changed by changing the number of first gas channels 43 and the number of second gas channels 44 as shown in Table 1 while setting the cross-sectional area of each first gas channel 43 and the cross-sectional area of each second gas channel 44 to be the same as each other. Fuel cells 10 according to Sample No. 1 to Sample No. 10 have basically the same configuration as each other except for the sum (S1) of the cross-sectional areas of the first gas channels 43 and the sum (S2) of the cross-sectional areas of the second gas channels 44.
Evaluation Method Each sample was evaluated by measuring an electromotive force of fuel cells 10 produced as described above, under the following conditions. First, the fuel cells 10 were inserted into the manifold 2 to connect the first gas channels 43 to the gas supply chamber 21 and connect the second gas channels 44 to the gas collection chamber 22. Then, fuel gas was supplied to the gas supply chamber 21 of the manifold 2 and air was supplied to both surfaces of the fuel cells 10. Offgas that flowed through the first gas channels 43 and the second gas channels 44 was collected in the gas collection chamber 22. Evaluation was performed under the following conditions: a temperature of 750° C., a current density of 0.2 A/cm$^2$, a fuel utilization rate of 80%, and an air utilization rate of 5%.

TABLE 1

| No. | Number of first gas channels | Number of second gas channels | S1/S2 | Cell average output voltage (V) |
|---|---|---|---|---|
| 1 | 25 | 25 | 1 | 0.799 |
| 2 | 24 | 26 | 0.92 | 0.810 |
| 3 | 21 | 29 | 0.72 | 0.815 |
| 4 | 18 | 32 | 0.56 | 0.817 |
| 5 | 15 | 35 | 0.43 | 0.819 |
| 6 | 12 | 38 | 0.32 | 0.822 |
| 7 | 9 | 41 | 0.22 | 0.825 |
| 8 | 6 | 44 | 0.14 | 0.828 |
| 9 | 4 | 46 | 0.10 | 0.832 |
| 10 | 1 | 49 | 0.02 | 0.835 |

As shown in Table 1, it was found that, as a result of the sum of the cross-sectional areas of the first gas channels 43 being made smaller than the sum of the cross-sectional areas of the second gas channels 44, the output of the fuel cells 10 can be improved.

The invention claimed is:
1. A fuel cell including a distal end portion and a proximal end portion, the fuel cell comprising:
a support substrate constituted of a porous material having no electron conductivity;
at least one power generation element portion disposed on the support substrate;
at least one first gas channel extending from the proximal end portion toward the distal end portion in the support substrate; and
at least one second gas channel extending from the proximal end portion toward the distal end portion in the support substrate, the second gas channel being connected to the first gas channel in the distal end portion,
wherein only the support substrate is provided between the at least one first gas channel and the at least one second gas channel, the sum of a cross-sectional area of the at least one first gas channel is smaller than the sum of a cross-sectional area of the at least one second gas channel and a ratio of the sum of the cross-sectional area of the at least one first gas channel to the sum of the cross-sectional area of the at least one second gas channel is 0.92 or less.
2. The fuel cell according to claim 1, wherein the at least one first gas channel has a smaller cross-sectional area than that of the at least one second gas channel.
3. The fuel cell according to claim 1, wherein the number of the first gas channels is smaller than the number of the second gas channels.
4. The fuel cell according to claim 1, further comprising a connection channel connecting the at least one first gas channel and the at least one second gas channel to each other in the distal end portion of the fuel cell.
5. The fuel cell according to claim 1, wherein the fuel cell comprises a plurality of the first gas channels.
6. The fuel cell according to claim 5, wherein a pitch between a first gas channel and a second gas channel that are adjacent to each other is larger than a pitch between first gas channels that are adjacent to each other.
7. A cell stack device comprising:
the fuel cell according to claim 1; and
a manifold including a gas supply chamber and a gas collection chamber, the manifold supporting the proximal end portion of the fuel cell,
wherein the at least one first gas channel is connected to the gas supply chamber, and
the at least one second gas channel is connected to the gas collection chamber.

* * * * *